United States Patent
Sathath

(10) Patent No.: US 7,221,320 B2
(45) Date of Patent: May 22, 2007

(54) ANTENNA AND INFORMATION PROCESSING APPARATUS

(75) Inventor: Anwar Sathath, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/170,619

(22) Filed: Jun. 30, 2005

(65) Prior Publication Data
US 2006/0001571 A1   Jan. 5, 2006

(30) Foreign Application Priority Data
Jun. 30, 2004   (JP) .............................. 2004-194932

(51) Int. Cl.
*H01Q 1/38* (2006.01)
*H01Q 13/10* (2006.01)
(52) U.S. Cl. .............................. 343/700 MS; 343/767
(58) Field of Classification Search ......... 343/700 MS, 343/702, 767, 846
See application file for complete search history.

(56) References Cited

U.S. PATENT DOCUMENTS 6,191,740 B1 * 2/2001 Kates et al. ......... 343/700 MS
6,384,785 B1 * 5/2002 Kamogawa et al. . 343/700 MS

FOREIGN PATENT DOCUMENTS

JP   2000-261235   9/2000

* cited by examiner

Primary Examiner—Shih-Chao Chen
(74) Attorney, Agent, or Firm—Pillsbury Winthrop Shaw Pittman LLP

(57) ABSTRACT

An antenna has a multilayer substrate in which are laminated a first conductive plate, a first dielectric layer disposed on the first conductive plate, a conductive strip line which is disposed on the first dielectric layer and which has an input/output terminal for an electric signal and an open terminal, a second dielectric layer disposed so as to sandwich the strip line in cooperation with the first dielectric layer, and a second conductive plate which is disposed on the second dielectric layer and which has a slot. In addition, the antenna has a third conductive plate for covering, of all the side surfaces of the multilayer substrate, a surface opposing the open terminal of the strip line.

14 Claims, 4 Drawing Sheets

FIG. 4
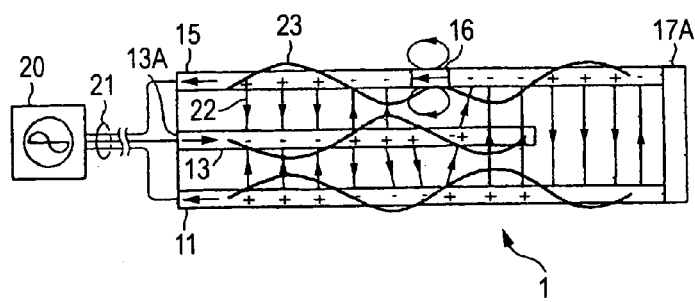
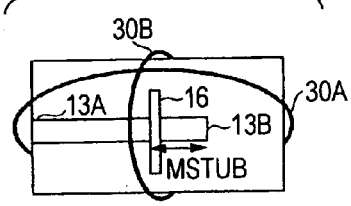
FIG. 5A
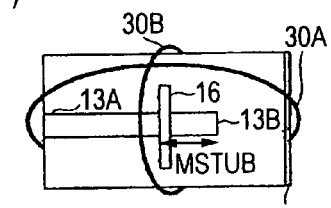
FIG. 5B
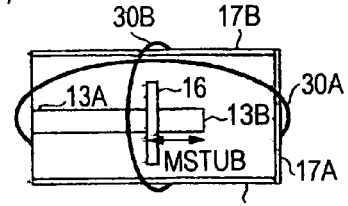
FIG. 5C
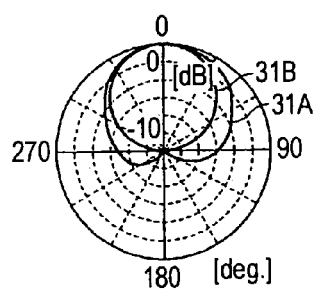
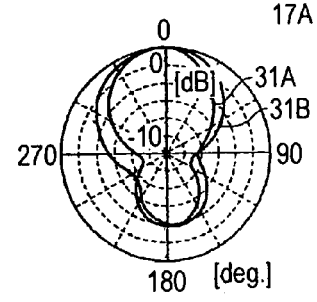
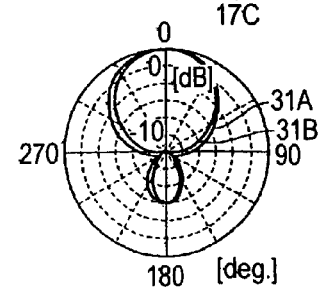

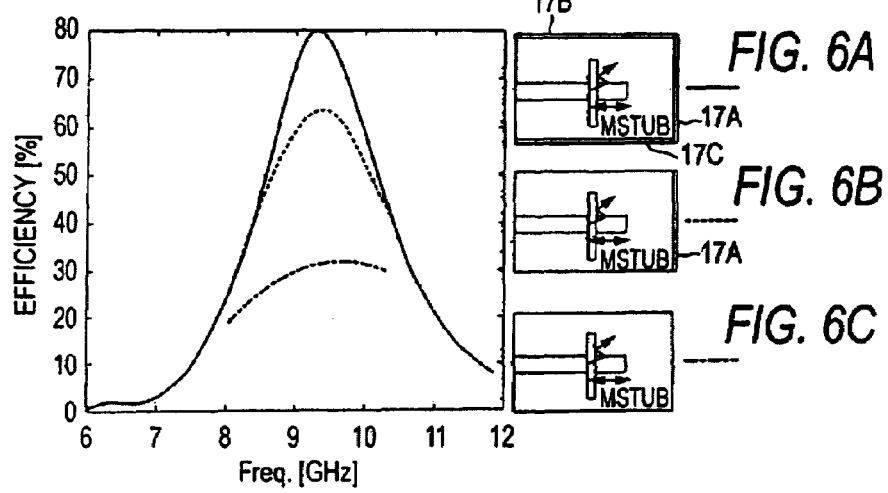
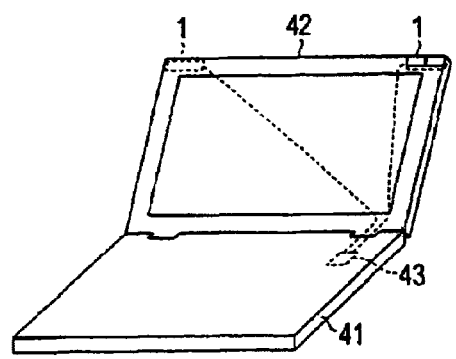

ANTENNA AND INFORMATION PROCESSING APPARATUS

CROSS-REFERENCE TO RELATED APPLICATIONS

This application is based upon and claims the benefit of priority from the prior Japanese Patent Application No. 2004-194932, filed on Jun. 30, 2004; the entire contents of which are incorporated herein by reference.

BACKGROUND OF THE INVENTION

1. Field of the Invention

The present invention relates to a directional antenna and to an information processing apparatus having the antenna. More particularly, the invention relates to an antenna having an aperture from which radio waves are radiated.

2. Description of the Related Art

A directional antenna is often employed for improving efficiency of transmission power and received power of a communication device. As such a directional antenna, a variety of antennas have been proposed.

For instance, JP-A-2000-261235 discloses a technique for suppressing an energy loss in a triplate-line-feed-type microstrip antenna attributable to propagation of a reflected wave in a TEM mode, such as a parallel-plate mode, by means of forming a through hole for electrically connecting a first ground conductor and a second ground conductor.

BRIEF SUMMARY OF THE INVENTION

However, according to the technique disclosed in JP-A-2000-261235, an energy loss deriving from propagation of a reflected wave in a TEM mode, such as a parallel-plate mode, can be suppressed to a certain extent; however, other energy losses are considered to still remain. To this end, improvement in radiation efficiency of radio waves has been desired.

The present invention has been conceived in view of the above circumstance and an object thereof is to provide an antenna which is improved in radiation efficiency of radio waves, as well as an information processing apparatus having the antenna.

An antenna according to an aspect of the present invention includes: a multilayer substrate in which are laminated a first conductive plate, a first dielectric layer disposed on the first conductive plate, a conductive transmission line which is disposed on the first dielectric layer and which has an input/output terminal for an electric signal and an open terminal, a second dielectric layer disposed so as to sandwich the transmission line in cooperation with the first dielectric layer, and a second conductive plate disposed on the second dielectric layer; and a third conductive plate for covering, of all side surfaces of the multilayer substrate, a surface opposing the open terminal of the transmission line; wherein the second conductive plate has an aperture for radiating radio waves, which are generated when the electric signal is transmitted by way of the transmission line, to the outside of the multilayer substrate.

An information processing apparatus according to another aspect of the present invention includes: a main body; and at least one antenna disposed on the main body; wherein the antenna includes: a multilayer substrate in which are laminated a first conductive plate, a first dielectric layer disposed on the first conductive plate, a conductive transmission line which is disposed on the first dielectric layer and which has an input/output terminal for an electric signal and an open terminal, a second dielectric layer disposed so as to sandwich the transmission line in cooperation with the first dielectric layer, and a second conductive plate disposed on the second dielectric layer; and a third conductive plate for covering, of all side surfaces of the multilayer substrate, a surface opposing the open terminal of the transmission line; and the second conductive plate has an aperture for radiating radio waves, which are generated when the electric signal is transmitted by way of the transmission line, to the outside of the multilayer substrate.

An information processing apparatus according to still another aspect of the present invention includes: a main body; a display unit which pivotably opens and closes with respect to the main body; and at least one antenna disposed on the display unit; wherein the antenna includes: a multilayer substrate in which are laminated a first conductive plate, a first dielectric layer disposed on the first conductive plate, a conductive transmission line which is disposed on the first dielectric layer and which has an input/output terminal for an electric signal and an open terminal, a second dielectric layer disposed so as to sandwich the transmission line in cooperation with the first dielectric layer, and a second conductive plate disposed on the second dielectric layer; and a third conductive plate for covering, of all side surfaces of the multilayer substrate, a surface opposing the open terminal of the transmission line; and the second conductive plate has an aperture for radiating radio waves, which are generated when the electric signal is transmitted through the transmission line, to the outside of the multilayer substrate.

According to the invention, radiation efficiency of radio waves can be improved.

BRIEF DESCRIPTION OF THE DRAWINGS

FIG. 4 is a diagram showing the distribution of an electric field generated when power is fed to the antenna;

FIGS. 5A to 5C are views for describing that a directivity varies among a case where, on the side surface of a multilayer substrate, no conductive plate is disposed (FIG. 5A); a case where a single conductive plate is disposed (FIG. 5B); and a case where three conductive plates are disposed (FIG. 5C);

FIGS. 6A to 6D are views for describing that radiation efficiency varies among a case where, on the side surface of the multilayer substrate 18, three conductive plates are disposed (FIG. 6A); a case where a single conductive plate is disposed (FIG. 6B); and a case where no conductive plate is disposed (FIG. 6C);

FIG. 7 is a perspective view showing an example case where the antenna is applied to a notebook PC;

DETAILED DESCRIPTION OF THE INVENTION

Embodiments of the present invention will be described with reference to the drawings.

Figure 1:
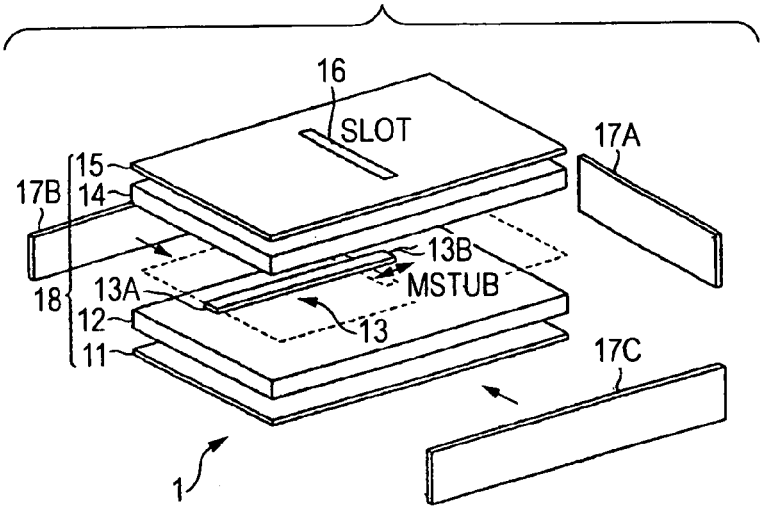
FIG. 1 is a view showing a state where respective members constituting an antenna according to an embodiment of the invention are developed.
Figure 2:
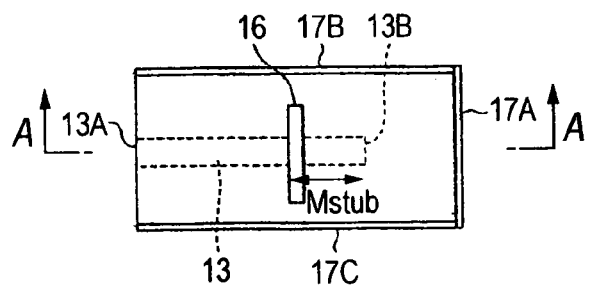
FIG. 2 is a plan view showing the antenna as viewed from the top.
Figure 3:
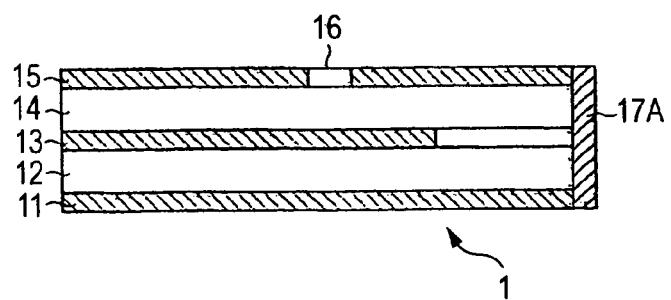
FIG. 3 is a cross-sectional view of the antenna taken along a plane indicated by arrows A—A in FIG. 2.

FIG. 1 is a view showing a state where respective members constituting an antenna according to an embodiment of the invention are developed. Meanwhile, the drawing shows a development view for facilitating the understanding of the structure of the antenna. However, in an actual antenna, the respective members are connected to one another. FIG. 2 is a plan view showing an antenna 1 as viewed from the top. FIG. 3 is a cross-sectional view of the antenna 1 taken along a plane indicated by arrows A—A in FIG. 2. Meanwhile, the hatched patterns in the drawing indicate conductor portions. First, descriptions will be given by reference to FIGS. 1 to 3. Meanwhile, identical elements in the respective drawings are denoted by the same reference numerals.

The antenna 1 according to the embodiment has a multilayer structure corresponding to a feed method, a so-called triplate feed; and is a one-plane-directional slot antenna of a triplate-feed type which radiates radio waves from an aperture, called a slot, and receives radio waves transmitted from the outside from the same. Each member (in particular, dielectric layers) constituting the antenna 1 has such durability as not to be broken even when the member is bent by about 90 degrees. Hence, the antenna 1 can be attached to an information processing apparatus, such as a personal computer or a PDA, in a state that the side section of the antenna 1 is bent like paper.

As shown in the drawings, the antenna 1 has a multilayer substrate 18 in which are laminated a first conductive plate 11, a first dielectric layer 12 disposed on the first conductive plate 11, a conductive strip line (a transmission line) 13 which is disposed on the first dielectric layer 12 and which has an input/output terminal 13A for an electric signal and an open terminal 13B, a second dielectric layer 14 disposed so as to sandwich the strip line 13 in cooperation with the first dielectric layer 12, and a second conductive plate 15 disposed on the second dielectric layer 14.

In addition, the antenna 1 has a third conductive plate 17A for covering, of all the side surfaces of the multilayer substrate 18, a surface (also referred to as an end surface) opposing the open terminal 13B of the strip line 13.

The antenna 1 further has a fourth conductive plate 17B and a fifth conductive plate 17C for respectively covering two side surfaces adjacent to the surface opposing the open terminal 13B (the surface covered by the third conductive plate 17A).

The first conductive plate 11, the second conductive plate 15, the third conductive plate 17A, the fourth conductive plate 17B, and the fifth conductive plate 17C are connected so as to be electrically short-circuited. Meanwhile, these members are not necessarily independent members, and may be embodied as an integrated single member. Alternatively, only the third conductive plate 17A, the fourth conductive plate 17B, and the fifth conductive plate 17C may be embodied as an integrated single member.

The second conductive plate 15 has a slot (aperture) 16 of an elongated geometry at substantially the center thereof. From the slot 16, radio waves ¾ which are generated upon transmission of an electric signal by way of the strip line 13 are radiated to the outside of the multilayer substrate 18. The slot 16 functions as a radiation source for radiating directional radio waves.

In addition, a distance Mstub, which is a distance from a position on the strip line 13 closest to the slot 16 to the open terminal 13B, is desirably substantially one-fourth (for instance, about 2.7 mm) of a wavelength (a wavelength λ corresponding to a resonance frequency) of the generated radio waves. When the distance Mstub is set as above, intensity of a standing wave generated around the strip line 13 in the vicinity of the slot 16 becomes optimum, thereby maximizing radiation efficiency.

Alternatively, the distance Mstub may be substantially set to $((N-1)/2+1/4)\lambda$, where N represents integer. Thus, the distance Mstub may be set to three-fourth of the wavelength λ.

FIG. 4 is a diagram showing the distribution of an electric field generated when power is fed to the antenna 1.

A feed unit 20 which performs supply and input/output of an electric signal is used for driving the antenna 1. The feed unit 20 is disposed, for instance, at a communication module located apart from the antenna 1. The feed unit 20 is connected to the first conductive plate 11, the strip line 13, and the second conductive plate 15, which are elements of the antenna 1, by way of a cable 21.

The feed unit 20 has a high-frequency oscillator for radiating an AC signal of a predetermined high frequency, and applies a voltage between the strip line 13 and the first conductive plate 11, and between the strip line 13 and the second conductive plate 15. The feed unit 20 transmits, to the input/output terminal 13A of the strip line 13, data to be transmitted to another device as an electric signal; and, in contrast, acquires radio waves transmitted from another device by way of the input/output terminal 13A as an electric signal.

When the antenna 1 is supplied with electricity, and an electric signal is input from the input/output terminal 13A, the electric signal propagates through the strip line 13. At this time, as shown in FIG. 4, an electric field 22 and a magnetic field (not shown) are generated between the first conductive plate 11, the strip line 13, and the second conductive plate 15; and, furthermore, a radio wave 23 and a magnetic wave (not shown) are generated.

In the vicinity of the slot 16, significant changes occur in the electric field and in the magnetic field, whereby radio waves are radiated upward (a direction perpendicular to the surface of the of the second conductive plate 15) by way of the slot 16. When an electric signal input from the input/output terminal 13A includes data, the data are superimposed on the radio waves radiated from the slot 16. In contrast, when radio waves transmitted from another device are received by way of the slot 16, the radio waves are acquired inside the antenna 1; converted into an electric signal; and transmitted to the feed unit 20.

In particular, since the antenna 1 of the present embodiment includes the third conductive plate 17A, the fourth conductive plate 17B, and the fifth conductive plate 17C, the electric field and the magnetic field do not leak from the side surfaces of the multilayer substrate 18. Accordingly, an energy loss can be suppressed to a large extent, thereby significantly improving radiation efficiency of radio waves radiated from the slot 16. Meanwhile, there may also be employed another configuration in which only the third conductive plate 17A is provided, and the fourth conductive plate 17B and the fifth conductive plate 17C are not provided. Also in this case, an energy loss can be suppressed efficiently, thereby improving radiation efficiency of the radio waves.

FIGS. 5A to 5C are views for describing that directivity varies among a case where, on the side surface of the multilayer substrate 18, no conductive plate is disposed (FIG. 5A); a case where a single conductive plate is disposed (FIG. 5B); and a case where three conductive plates are disposed (FIG. 5C).

Meanwhile, reference numeral 30A in the drawing denotes a measurement range of radiation in the longitudinal direction of the antenna 1, and reference numeral 30B denotes a measurement range of radiation in the width direction of the same. Reference numeral 31A in the drawing denotes a radiation characteristic (hereinafter called "longitudinal radiation characteristic") corresponding to the measurement range 30A; and reference numeral 31B denotes a radiation characteristic (hereinafter called "lateral radiation characteristic") corresponding to the measurement range 30B. The center of the pie chart in the drawing corresponds to a center of the antenna 1; "270 degrees" corresponds to a direction for the input/output terminal 13A; "90 degrees" corresponds to a direction for the open terminal 13B; and "0 degrees" corresponds to an ideal direction for radiating radio waves from the slot 16.

In a case where no conductive plate is provided as shown in FIG. 5A (i.e., a case of the related art), the longitudinal radiation characteristic 31A expands particularly in the direction of 90 degrees, and its directivity in the direction of 0 degrees is low.

In a case where the third conductive plate 17A is provided as shown in FIG. 5B, the longitudinal radiation characteristic 31A in the direction of 90 degrees is substantially suppressed, and its directivity in the direction of 0 degrees is improved.

In a case where the fourth conductive plate 17B and the fifth conductive plate 17C are provided in addition to third conductive plate 17A as shown in FIG. 5C, with respect not only to the longitudinal radiation characteristic 31A but also to the lateral radiation characteristic 31B, their directivities in the direction of 0 degrees are improved.

FIGS. 6A to 6D are views for describing, by reference to a graph shown in FIG. 6D, that the radiation efficiency varies among a case where, on the side surface of the multilayer substrate 18, three conductive plates are disposed (FIG. 6A); a case where a single conductive plate is disposed (FIG. 6B); and a case where no conductive plate is disposed (FIG. 6C).

The graph in FIG. 6D shows radiation efficiency [%] with respect to frequencies [GHz], in a state where the distance Mstub is set to 2.7 mm, of electric signals of the above three cases, respectively. In the graph, radiation efficiency of a case shown in FIG. 6A is indicated by a solid line, that of a case shown in FIG. 6B is indicated by a broken line, and that of a case shown in FIG. 6C is indicated by a line consisting of long and short dashes.

In a case where no conductive plate is provided as shown in FIG. 6C (i.e., a case of the related art), the radiation efficiency cannot be the to be high (see the line consisting of long and short dashes in the graph).

In a case where the third conductive plate 17A is provided as shown in FIG. 6B, as compared with the case of FIG. 6C, the radiation efficiency is improved considerably (see the broken line in the graph).

In a case where the fourth conductive plate 17B and the fifth conductive plate 17C are provided in addition to third conductive plate 17A as shown in FIG. 6A, as compared with the case of FIG. 6B, the radiation efficiency is further improved (see the solid line in the graph).

The antenna 1 can be used by means of being mounted to a variety of information processing equipment, such as a notebook personal computer (hereinafter called "notebook PC"), a pocket PC, a PDA (personal digital assistant), a cell phone, or a PHS.

FIG. 7 is a perspective view showing an example case where the antenna 1 is applied to a notebook PC. The notebook PC has a main body 41, and a display unit 42 which pivotably opens and closes with respect to the main body 41 at a hinge section.

Two sets each consisting of the antenna 1, of the same type, are disposed at, of four corners of the display unit 42, two corners (the upper right corner and the upper left corner) upwardly located when the display unit 42 is open. For instance, the two antennas 1 realize a function of a so-called diversity antenna.

Meanwhile, a radio communication module 43 (including an RF section, and the like) for performing radio communication is incorporated in the main body 41. In addition, the previously-mentioned feed unit 20 (see FIG. 4) is mounted in the radio communication module 43, and is connected to the respective antennas 1 by way of cables.

In such a configuration, one antenna 1 is located so as to radiate radio waves forward of the display unit 42; and the other antenna 1 is located so as to radiate radio waves rearward of the display unit 42. By virtue of the arrangement, radiation ranges of the two antennas 1 do not overlap, thereby realizing transmission and receipt of radio waves over a wide range.

Alternatively, there also may be employed another configuration in which the respective antennas 1 are disposed (incorporated) inside the display unit 42, and openings are formed in the surface of the display unit 42 so that the slots 16 of the antennas 1 are exposed from the surface of the display unit 42. When such a configuration is employed, radio communication of high quality can be realized without impairing an external view of the information processing equipment and disturbing radiation of radio waves. Alternatively, the respective antennas 1 may be disposed (incorporated) inside the display unit 42. In this case, application of processing on the surface of the display unit 42 is negated.

As described above, by means of disposing the antennas 1 excellent in radiation efficiency at the display unit 42 of a notebook PC, radio communication of high quality can be realized with the notebook PC.

Figure 8:
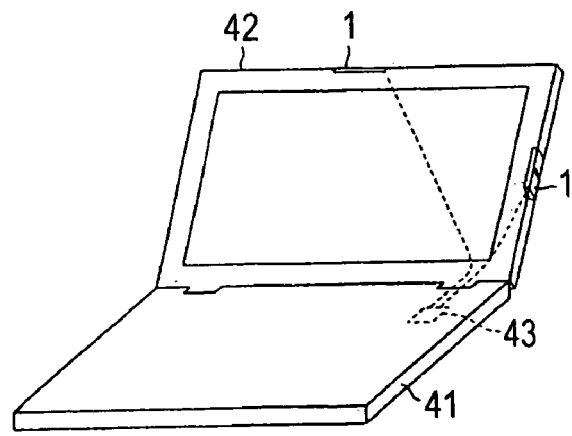
FIG. 8 is a perspective view showing a modification of the example shown in FIG. 7.

FIG. 8 is a perspective view showing a modification of the example shown in FIG. 7. The example shown in FIG. 8 differs from that in FIG. 7 in arrangement of the respective antennas 1. In the example shown in FIG. 8, one antenna 1 is on the upper edge of the display unit 42; and the other antenna 1 is located on the side edge of the display unit 42. Also in this case, radiation ranges of the two antennas 1 do not overlap, thereby realizing transmission and receipt of radio waves over a wide range.

When the width of the edge of the display unit 42 is small, the antennas 1 may be disposed in a state such that the respective display units 42 are bent. Alternatively, the respective antennas 1 may be disposed (incorporated) inside the display unit 42. At this time, openings may be formed in edges of the display unit 42 so that the slots 16 of the respective antennas 1 are exposed from the edges of the display unit 42.

Figure 9:
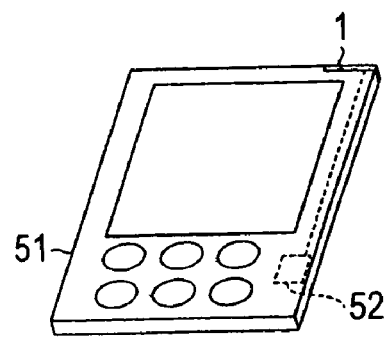
FIG. 9 is a perspective view showing an example case where the antenna is applied to a PDA.

FIG. 9 is a perspective view showing an example case where the antenna 1 is applied to a PDA.

A PDA 51 is a portable information terminal including a display section, an input section, and the like. The antenna 1 is disposed on a corner of the PDA 51. In addition, the radio communication module 52 (including an RF section, and the like) for performing radio communication is incorporated in the PDA 51. Furthermore, the previously-mentioned feed unit 20 (see FIG. 4) is mounted in the radio communication module 52, and is connected to the antenna 1 by way of a cable.

Alternatively, an opening may be formed in the surface of the PDA 51 so that the slot 16 of the antenna 1 is exposed from the surface of the PDA 51. When such a configuration is employed, radio communication of high quality can be realized without impairing an external view and disturbing radiation of radio waves.

As described above, by means of disposing the antenna 1 of excellent radiation efficiency in the PDA 51, radio communication of high quality can be realized with the PDA 51.

Meanwhile, the present invention is not limited to the above embodiment, and when being practiced, the invention can be embodied while modifying the constituent elements without departing from the scope of the invention. A variety of inventions can also be realized by appropriately combining a plurality of constituent elements disclosed in the embodiment. For instance, some constituent elements may be omitted from the elements described in the embodiment. Moreover, constituent elements used in different embodiments may be combined appropriately.

What is claimed is:

1. An antenna comprising:
   a multilayer substrate in which are laminated a first conductive plate, a first dielectric layer disposed on the first conductive plate, a conductive transmission line which is disposed on the first dielectric layer and which has an input/output terminal for an electric signal and an open terminal, a second dielectric layer disposed so as to sandwich the transmission line in cooperation with the first dielectric layer, and a second conductive plate disposed on the second dielectric layer; and
   a third conductive plate for covering, of all side surfaces of the multilayer substrate, a surface opposing the open terminal of the transmission line;
   wherein the second conductive plate has an aperture for radiating radio waves, which are generated when the electric signal is transmitted by way of the transmission line, to the outside of the multilayer substrate.

2. The antenna according to claim 1, further comprising a fourth conductive plate and a fifth conductive plate for respectively covering two side surfaces adjacent to the third conductive plate.

3. The antenna according to claim 1, wherein the first conductive plate, the second conductive plate, and the third conductive plate are connected so as to be electrically short-circuited.

4. The antenna according to claim 1, wherein a distance from a position on the line closest to the aperture to the open terminal is substantially set to $((N-1)/2+1/4)\lambda$, where N represents integer and $\lambda$ represents a wavelength of the generated radio waves.

5. An information processing apparatus comprising:
   a main body; and
   at least one antenna disposed on the main body;
   wherein the antenna comprises:
      a multilayer substrate in which are laminated a first conductive plate, a first dielectric layer disposed on the first conductive plate, a conductive transmission line which is disposed on the first dielectric layer and which has an input/output terminal for an electric signal and an open terminal, a second dielectric layer disposed so as to sandwich the transmission line in cooperation with the first dielectric layer, and a second conductive plate disposed on the second dielectric layer; and
      a third conductive plate for covering, of all side surfaces of the multilayer substrate, a surface opposing the open terminal of the transmission line; and
   the second conductive plate has an aperture for radiating radio waves, which are generated when the electric signal is transmitted by way of the transmission line, to the outside of the multilayer substrate.

6. The information processing apparatus according to claim 5, wherein the information processing apparatus incorporates the antenna; and
   an opening is formed in a surface of the information processing apparatus so that the aperture is exposed from the surface of the information processing apparatus.

7. The information processing apparatus according to claim 6, wherein the antenna comprises a plurality of antennas for radiating radio waves in different directions.

8. The information processing apparatus according to claim 5, further comprising a fourth conductive plate and a fifth conductive plate for respectively covering two side surfaces adjacent to the third conductive plate.

9. The antenna according to claim 5, wherein the first conductive plate, the second conductive plate, and the third conductive plate are connected so as to be electrically short-circuited.

10. An information processing apparatus comprising:
    a main body;
    a display unit which pivotably opens and closes with respect to the main body; and
    at least one antenna disposed on the display unit;
    wherein the antenna comprises:
       a multilayer substrate in which are laminated a first conductive plate, a first dielectric layer disposed on the first conductive plate, a conductive transmission line which is disposed on the first dielectric layer and which has an input/output terminal for an electric signal and an open terminal, a second dielectric layer disposed so as to sandwich the transmission line in cooperation with the first dielectric layer, and a second conductive plate disposed on the second dielectric layer; and
       a third conductive plate for covering, of all side surfaces of the multilayer substrate, a surface opposing the open terminal of the transmission line; and
    the second conductive plate has an aperture for radiating radio waves, which are generated when the electric signal is transmitted through the transmission line, to the outside of the multilayer substrate.

11. The information processing apparatus according to claim 10, wherein the display unit incorporates the antenna; and
    an opening is formed in a surface of the display unit so that the aperture is exposed from the surface of the display unit.

12. The information processing apparatus according to claim 11, wherein the antenna comprises a plurality of antennas for radiating radio waves in different directions.

13. The information processing apparatus according to claim 9, further comprising a fourth conductive plate and a fifth conductive plate for respectively covering two side surfaces adjacent to the third conductive plate.

14. The information processing apparatus according to claim 9, wherein the first conductive plate, the second conductive plate, and the third conductive plate are connected so as to be electrically short-circuited.

* * * * *